G. F. SMITH.
CAR LIGHTING SYSTEM.
APPLICATION FILED DEC. 22, 1919.
1,433,749.
Patented Oct. 31, 1922.
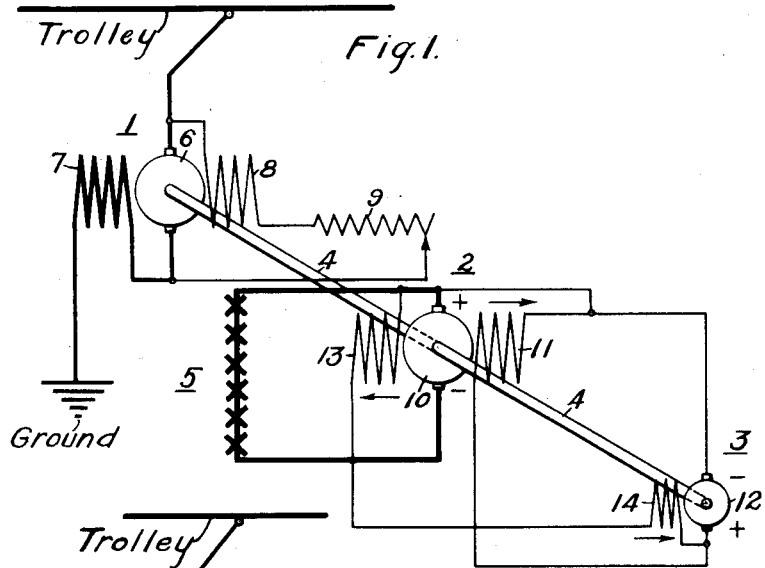
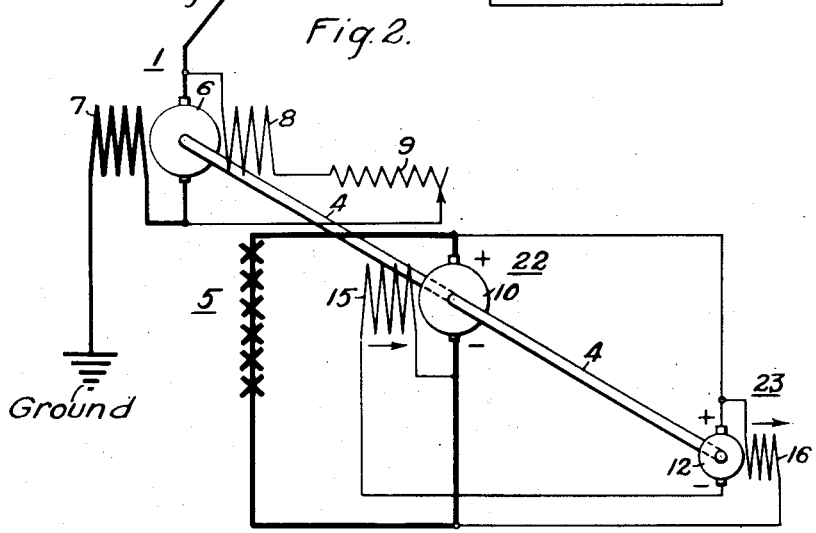
WITNESSES:
J. A. Helsel
W. R. Coley
INVENTOR
Gerald F. Smith.
BY
Wesley G. Carr
ATTORNEY Patented Oct. 31, 1922.

1,433,749

UNITED STATES PATENT OFFICE.

GERALD F. SMITH, OF WILKINSBURG, PENNSYLVANIA, ASSIGNOR TO WESTINGHOUSE ELECTRIC & MANUFACTURING COMPANY, A CORPORATION OF PENNSYLVANIA.

CAR-LIGHTING SYSTEM.

Application filed December 22, 1919. Serial No. 346,599.

*To all whom it may concern:*

Be it known that I, GERALD F. SMITH, a citizen of the United States, and a resident of Wilkinsburg, in the county of Allegheny and State of Pennsylvania, have invented a new and useful Improvement in Car-Lighting Systems, of which the following is a specification.

My invention relates to car-lighting systems and it has special relation to motor-generator arrangements, or the equivalent, whereby a substantially constant voltage may be delivered to a car-lighting circuit or the like.

One object of my invention is to provide a relatively simple and reliable combination of dynamo-electric machines whereby a substantially constant output voltage may be maintained, irrespective of the unavoidable fluctuations of input voltage from a trolley circuit.

More specifically stated, it is one object of my invention to provide a motor-generator set including an auxiliary exciter machine that is so connected to the main generator as to provide an excitation thereof that is proportional to the voltage of the generator, such excitation being further varied in accordance with certain combined relations of the exciter and the generator voltage.

My invention may best be understood by reference to the accompanying drawing, wherein Figure 1 is a diagrammatic view of the essential cricuits of a car-lighting motor-generator set organized in accordance with my present invention; and, Fig. 2 is a similar diagrammatic view of a modified form of the invention.

Referring to Fig. 1, the apparatus here shown comprises supply-circuit conductors Trolley and Ground for supplying energy to an electric vehicle upon which is installed a motor-generator set comprising a driving motor 1, a generator 2 and an exciter or auxiliary machine 3, the armatures of all the machines being mounted on a common shaft 4 or being otherwise mechanically coupled to rotate together.

It will be understood that the driving motor 1 is not essential to the present invention and that any other variable-speed motive element, such as a car axle, may be employed in carrying out my invention.

The car-lighting or other circuit to which it is desired to deliver a substantially constant voltage, is denoted by the reference character 5.

The driving motor 1 comprises a commutator-type armature 6, a series field winding 7 and a shunt field winding 8 that is connected, through a variable resistor 9, across the terminals of the motor armature 6.

The generator 2 comprises a commutator-type armature 10, a field winding 11 that is connected across the terminals of the exciter armature 12, and a second field winding 13 that is connected across the corresponding armature 10.

The field winding 11 for the generator 2 is adapted to provide a differential excitation with respect to the main field winding 13, as indicated by the arrows, and receives the full exciter voltage which, in turn, is dependent upon the sum of the voltages of the generator armature 10 and the exciter armature 12, since the single field winding 14 for the exciter is energized in accordance with this sum, as will be evident from the connection of the field winding 14 with respect to the positive and negative brushes, indicated by corresponding signs, of the generator 2 and the exciter 3.

The magnetic circuit of the exciter 3 is designed in such manner that, above a predetermined value of current in the exciting field winding 14, the magnetic circuit is very rapidly saturated. This result may be accomplished, for example, by employing wide teeth of relatively shallow depth for the armature punchings or laminations of the exciter, whereby the desired saturation will occur in the teeth of such restricted area. It is also desirable that the armature ampere-turns of the exciter be relatively high, as compared with the field ampere-turns, so that, above a certain speed, the distortion of the field flux caused by the heavy armature flux will play an important part in preventing the voltage of the exciter 3 from rising.

It will be appreciated that the exciter 3 may be of relatively small size and capacity and may be readily mounted on the end of the generator shaft to occupy a minimum amount of space.

The operation of the apparatus shown in

Fig. 1 may be set forth as follows. The compound-wound driving motor 1 will vary in speed in accordance with the fluctuations of line voltage and, of course, the generator 2 and the exciter 3 will rotate at the same speed as the driving motor. Nevertheless, the generator-delivered voltage will remain substantially constant, since the resultant field will be reduced as the speed increases, and vice versa, by reason of the differential effect, with respect to the main-field winding 13, of the other generator field winding 11, which receives a voltage that is a function of both the speed of the motor-generator set and the sum of the generator and the exciter voltages.

The action of the exciter 3 may set forth as follows: Assuming first that the generator 2 is running at normal speed, and that the speed then falls off. In this case, the exciter field drops by reason of the reduction in the voltage of the exciter. The speed of the exciter also being reduced, the voltage of the exciter decreases very rapidly, which reduces the differential effect of field winding 11, thereby maintaining substantially constant voltage at terminals of generator 2 for large reductions in speed. Now, assume that the speed increases instead of decreases. In this event, the excitation of the exciter rises, but, because of reaching the saturation point very quickly, only a slight increase in flux is obtained. The increase in voltage of the exciter is caused principally by the increase in speed of the machines. The rise in voltage is further counteracted by the reaction of the armature flux on the field flux, so that the rise in voltage of the exciter is relatively slow. Hence, the differential effect of the field winding 11 for overspeed is reduced, which gives a substantially constant voltage in the event of a large increase in speed.

In this way, and by reason of the special features incorporated in the exciter 3, as mentioned above, a substantially constant generator voltage is maintained over a relatively wide speed range as the supply-circuit voltage fluctuates.

Referring to Fig. 2, the illustrated apparatus comprises a driving motor 1 identical with that shown in Fig. 1 for driving a generator 22 and an exciter 23.

In the present instance, the generator 22 is provided with a single exciting field winding 15 which, to a certain extent, performs the same functions as those afforded in Fig. 1 by the two differentially-related field windings 11 and 13. In the present instance, the field winding 15 is excited in accordance with the difference between the generator voltage and the exciter voltage, as will be evident from an inspection of the relation of the field-winding connection to the positive and negative brushes, indicated by corresponding signs, of the generator 22 and the exciter 23.

The single exciting field winding 16 for the exciter 23 is connected across the terminals of the generator armature 10. Although the range of variation of the generator voltage will be slightly greater in the present system than that produced in the system of Fig. 1, nevertheless, an approximately constant car-lighting voltage is provided, and the system of Fig. 2 is advantageous in that a lighter and cheaper generator obtains by reason of the elimination of one field winding therefrom.

The operation of the system shown in Fig. 2 may be set forth as follows. Upon a fluctation of supply-circuit voltage, for example, a decrease, which causes a corresponding reduction in the speed of the driving motor 1, a commensurate decrease in the voltage of the generator armature 10 and of the exciter armature 12 tends to occur. However, the decreased energization of the exciter field winding 16, by reason of such incipient drop in the generator armature voltage and the reduction in speed, decreases the exciter armature voltage and, therefore, increases the difference between the voltages of the generator and the exciter, which difference is applied to the exciting field winding 15 for the generator. Consequently, the increase in excitation of the generator substantially compensates for the incipient decrease in delivered voltage because of the change in speed. Therefore, an approximately constant voltage is delivered to the car-lighting circuit 5 under conditions of supply-circuits-voltage fluctation, it being understood that the converse regulation inherently occurs upon an increase of supply-circuit voltage.

I do not wish to be restricted to the specific circuit connections or arrangement of parts herein set forth, as various modifications thereof may be made without departing from the spirit and scope of my invention. I desire, therefore, that only such limitation shall be imposed thereon as are indicated in the appended claims.

I claim as my invention:

1. The combination with a driving member, of a generator driven thereby and an exciter rotatable with said generator, said generator having a field winding energized in accordance with the exciter voltage and having a second field winding excited by the generator voltage differentially to the first-named field winding, and said exciter having a field winding connected to receive a certain combination of the generator and the exciter voltages.

2. The combination with a driving member, of a generator driven thereby and an exciter rotatable with said generator, said generator having a field winding energized from said exciter, and said exciter having a field winding connected to receive the sum of the generator and the exciter voltages.

3. The combination with a variable-speed driving member, of a generator and an exciter driven thereby, said generator having a plurality of differentially-related field windings respectively energized by the generator and the exciter, and said exciter having a single field winding connected to receive the sum of the generator and the exciter voltages.

In testimony whereof, I have hereunto subscribed my name this 18th day of December 1919.

GERALD F. SMITH.